(12) United States Patent
Kastenschmidt et al.

(10) Patent No.: US 8,448,569 B2
(45) Date of Patent: *May 28, 2013

(54) APPARATUS FOR TREATING MILK

(75) Inventors: Kevin M. Kastenschmidt, Rockland, WI (US); Matthew J. Stuessel, Alma Center, WI (US); David A. Becker, Winona, MN (US); Robert L. Buck, Holmen, WI (US); Ralph A. Rottier, Cable, WI (US)

(73) Assignee: GEA Farm Technologies, Inc., Naperville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/409,475

(22) Filed: Mar. 1, 2012

(65) Prior Publication Data
US 2012/0210883 A1    Aug. 23, 2012

Related U.S. Application Data

(63) Continuation of application No. 12/383,830, filed on Mar. 27, 2009, now Pat. No. 8,127,667.

(51) Int. Cl.
*A23C 3/02* (2006.01)
*A23C 3/07* (2006.01)
*A23L 3/28* (2006.01)

(52) U.S. Cl.
CPC .. *A23C 3/076* (2013.01); *A23L 3/28* (2013.01)
USPC ............................................. 99/451; 99/453

(58) Field of Classification Search
CPC ................................. A23C 3/076; A23L 3/28
USPC .................... 99/451, 453, 455, 483; 422/24; 426/248

See application file for complete search history.

(56) References Cited

U.S. PATENT DOCUMENTS

| | | | | | |
|---|---|---|---|---|---|
| 1,723,603 | A | * | 8/1929 | Chesney | 426/248 |
| 1,730,016 | A | * | 10/1929 | Rudd | 99/451 |
| 2,081,243 | A | * | 5/1937 | Macy | 99/451 |
| 2,147,912 | A | * | 2/1939 | Mojonnier | 62/201 |
| 2,170,402 | A | * | 8/1939 | Faust | 236/18 |
| 2,189,279 | A | * | 2/1940 | Bitner | 99/451 |
| 2,282,024 | A | * | 5/1942 | Bitner | 99/451 |
| 2,339,906 | A | * | 1/1944 | Barnes | 250/504 R |
| 2,340,890 | A | | 2/1944 | Lang et al. | |

(Continued)

FOREIGN PATENT DOCUMENTS

| | | |
|---|---|---|
| CA | 1159705 | 1/1984 |
| CH | 394775 | 6/1965 |

(Continued)

OTHER PUBLICATIONS

Godden, et al., "Pasteurized Milk and Colostrum for Calves: An Option or Necessity?" Department of Veterinary Population Medicine and Department of Animal Science, University of Minnesota, St. Paul, 5pp.

(Continued)

*Primary Examiner* — Stephen F Gerrity
(74) *Attorney, Agent, or Firm* — Smith Law Office

(57) ABSTRACT

The present invention is directed to a system for treating milk and colostrum. The system includes a circulation pump and piping system, a heat exchanger for adjusting and/or maintaining milk temperature, and an ultraviolet light treatment device that treats the milk.

14 Claims, 7 Drawing Sheets

U.S. PATENT DOCUMENTS

| | | | |
|---|---|---|---|
| 2,550,584 A * | 4/1951 | Mittelmann | 99/451 |
| 2,623,449 A * | 12/1952 | Losee | 99/455 |
| 2,636,991 A | 4/1953 | Postell | |
| 3,092,503 A * | 6/1963 | Gray | 426/241 |
| 3,182,193 A | 5/1965 | Ellner et al. | |
| 3,934,042 A | 1/1976 | De Stoutz | |
| 4,141,686 A | 2/1979 | Lewis | |
| 4,400,270 A | 8/1983 | Hillman | |
| 4,534,282 A | 8/1985 | Marinoza | |
| 4,738,302 A * | 4/1988 | Abma | 99/455 |
| 4,798,702 A | 1/1989 | Tucker | |
| 4,997,662 A * | 3/1991 | Lidman et al. | 426/231 |
| 5,288,471 A * | 2/1994 | Corner | 99/451 |
| 5,630,360 A * | 5/1997 | Polny, Jr. | 99/451 |
| 5,675,153 A | 10/1997 | Snowball | |
| 5,688,475 A * | 11/1997 | Duthie, Jr. | 422/186.3 |
| 5,709,799 A | 1/1998 | Engelhard | |
| 5,785,845 A | 7/1998 | Colaiano | |
| 6,280,615 B1 | 8/2001 | Phillips et al. | |
| 6,410,071 B1 * | 6/2002 | Polster | 426/521 |
| 6,916,452 B1 | 7/2005 | Rix et al. | |
| 8,127,667 B2 * | 3/2012 | Kastenschmidt et al. | 99/451 |
| 2005/0042129 A1 * | 2/2005 | Kazem | 422/24 |
| 2005/0103213 A1 * | 5/2005 | Dumm | 99/483 |

FOREIGN PATENT DOCUMENTS

| | | |
|---|---|---|
| DE | 1916540 | 11/1969 |
| DE | 3414870 | 10/1985 |
| EP | 0023892 | 2/1981 |
| EP | 0202820 | 11/1986 |
| EP | 0470518 | 2/1992 |
| EP | 0686601 | 12/1995 |
| FR | 1278161 | 10/1961 |
| FR | 1310471 | 10/1962 |
| FR | 80549 | 4/1963 |
| GB | 639467 | 6/1950 |
| SU | 1159521 | 6/1985 |
| SU | 1217315 | 3/1986 |
| SU | 656297 | 12/1993 |

OTHER PUBLICATIONS

J.R. Stabel, "On-Farm Batch Pasteurization Destroys *Mycobacterium paratuberculosis* in Waste Milk," American Dairy Science Association, J. Dairy Sci. 84:524-527, 4pp, 2001.

International Search Report and Written Opinion mailed Aug. 2, 2010 from PCT/US2010/00830, 2 pages.

PMO 2007: Standards for Grade "A" Pasteurized, Ultra-Pasteurized and Aseptically Processed Milk & Milk Products, U.S. Food and Drug Administration, (Item 16p. Pasteurization and Aseptic Processing-Administrative Procedures), 29pp, Aug. 26, 2010.

* cited by examiner

APPARATUS FOR TREATING MILK

This application is a continuation of U.S. Ser. No. 12/383,830, filed on Mar. 27, 2009, now U.S. Pat. No. 8,127,667 which is incorporated by reference in its entirety.

FIELD AND BACKGROUND OF THE INVENTION

This invention relates generally to liquid sterilization systems and more particularly to apparatus and methods for pasteurizing milk and colostrum for feeding to calves.

Calves in dairy harvesting facilities are fed non-saleable ("waste") milk collected from cows that have been removed from the main herd for medical or other reasons. While the feeding of non-saleable milk to dairy calves would seem to be economical for the dairy operator, there is a risk that infectious pathogens may be transmitted through the milk or shed directly from the cow's mammary gland. Other pathogens can be deposited in milk from manure or dirt, or can result from proliferation in milk that is not chilled or stored properly.

To reduce this risk, it is preferred that milk or colostrum be pasteurized before feeding to calves. Pasteurization in known processes includes heating milk to a target temperature to kill a target microbe and maintaining that temperature for a period of time. The pasteurized milk ordinance defines two different methods for pasteurization: 1) batch pasteurization at 145° F. for 30 minutes (low-temperature, long-time or LTLT), or 2) high-temperature, short-time pasteurization (HTST) at 161° F. for 15 seconds (usually using a continuous flow process). Heating and maintaining the heat above a target temperature results in a log reduction in concentration of viable bacteria. However, some heat-tolerant bacteria may survive the process. Further, in a poor quality milk with very high concentrations of bacteria, some pathogenic bacteria may survive the pasteurization process.

Pasteurization is desirable and sometimes necessary to kill bacteria, such as *E. coli*, *B. Cereus*, and *salmonella* that are harmful to calves. Heat pasteurization to 145° F. is successful at killing nearly 100% of these bacteria if the milk is maintained above 145° F. for at least thirty minutes. One study suggests that a lower temperature of 120° F. can be used, but that temperature must be maintained for at least sixty minutes.

Once pasteurized, milk may be bottled, chilled, stored, and then reheated to a feeding temperature of between 100° F. to 110° F. It may not be necessary to store pasteurized milk because it is more readily available and can be fed directly to calves after it is heat pasteurized and cooled to feeding temperature.

Also, colostrum is fed to newborn calves within two hours of birth and again within twelve hours of birth. Colostrum is collected from cows shortly after calving, and includes relatively high concentrations of carbohydrates, protein, and antibodies. Colostrum also contains high concentrations of immunoglobulins, such as IgG, and growth factors. Pasteurizing colostrum can result in congealing and loss of immunoglobulins. About 25% to 30% of IgG concentrations in colostrum are destroyed in heat pasteurization of colostrum and milk. Thus, heat pasteurization is beneficial overall, but has detrimental affects on milk and colostrum. Colostrum is usually chilled, bottled, and stored prior to re-heating and feeding.

Ultraviolet pasteurizers can also be used to treat milk. U.S. Pat. No. 6,916,452, to Rix et al. discloses that milk can be sterilized in a dairy using one or more UV sterilizer units while maintaining milk temperature above 82.4° F. (28° C.) before it is transferred to a chiller and a bulk milk storage vat. Such a pasteurizer is conceptually well-founded, but is not able to be used on its own in a dairy facility because it lacks critical features necessary to prepare the milk and colostrum for distribution and feeding to calves.

An improved pasteurization system is needed that successfully kills harmful bacteria, but destroys little or no immunoglobulins for optimum calf health.

SUMMARY OF THE INVENTION

The present invention is directed to a system and method for pasteurizing milk and/or colostrum for feeding to calves. The term "milk" as used herein should be understood to include milk, colostrum, other calf feed, and any related supplements. "Calves" as used herein includes any dairy animal such as cows, goats, and sheep.

The system includes a vat or vat for storing milk or colostrum, a circulation pump and piping system, a heat exchanger for adjusting and/or maintaining milk temperature, and an ultraviolet light pasteurizing unit ("UV reactor"). A controller activates the pump to circulate milk to a heat exchanger to raise milk temperature to between 85° F. and 120° F. and then circulates the warmed milk through the UV reactor at an appropriate rate and frequency to kill harmful bacteria. The milk can then be chilled and stored or fed directly to calves. By raising the milk temperature to only the range of 85° F. to 120° F., there is much less destruction of immunoglobulins and the milk is still safely pasteurized by the UV light from the UV reactor.

Unlike batch pasteurizers, UV reactors do not rely on the temperature of the milk to kill bacteria. Instead, the UV light alone in the range of 200 to 280 nanometers, UVC range (germicidal range), kills the bacteria. Nonetheless, milk temperature is important because cold milk is churned by the pump and piping system, and butter flakes can form that are less likely to be adequately treated by the UV light. Raising milk temperature to 85° F. or higher is sufficient to melt or reduce the size of butter flakes that form so that the milk is adequately treated by the UV reactors. Preferably, the milk temperature is raised to above 95° F., and more preferably to above 100° F. to ensure proper milk viscosity with minimal butter concentrations. On the other hand, heating milk to too high of a temperature can destroy beneficial immunoglobulins. An upper end of the temperature range to minimize destruction of the immunoglobulins is 120° F., and preferably 115° F., and more preferably 110° F.

A temperature range of about 85° F. to about 120° F. includes a feeding temperature range of between about 100° F. and about 110° F. If the milk is to be fed directly to calves, then heating to the feeding temperature range of between about 100° F. to 110° F. for pasteurizing is appropriate.

If the milk is to be chilled and stored after pasteurization, a milk temperature in the lower end of the range of 85° F. to 120° F. will produce adequate results with the present invention and reduce energy requirements. It is noted that treated waste milk may need to be transported to the calves where they are kept in the dairy facility. In this situation, heating the milk to above the feeding temperature range can compensate for milk cooling as it is being transported. Heat loss is a function of ambient conditions, the time between pasteurization and feeding, and other factors. Thus, using the present invention, milk temperature can be adjusted to compensate for these and other factors in any particular dairy situation.

Apparatus in accordance with the present invention can include one or more UV milk pasteurizer reactors, flow controllers, temperature controllers, and devices for setting and adjusting optimal milk temperature for milk leaving the apparatus to accommodate calf needs, temperature losses for time, distance and methods for transporting the milk to calves.

UV milk pasteurizers for use in the present invention can be those of the type disclosed in Rix et al., U.S. Pat. No. 6,916,452 (incorporated herein by reference). A number of such pasteurizers can be used in series to reduce the number of times milk is circulated through the UV reactors.

Preferably, the controller of present invention monitors UV reactor components and adjusts treatment time to accommodate defective UV bulbs, ballasts, or related components.

Flow controllers for use in the present invention include pumps and meters that pump milk through the UV reactor at a rate that ensures optimal sterilization of milk and/or colostrum and prevents stagnation in the UV reactor related piping, connections, and control systems. Preferably, the flow rate is about 17 gallons per minute, but other flow rates may be used as the number, size, and efficiency of UV reactors changes.

Temperature controllers for use in the present invention can include sensors and heat exchangers to warm or cool the milk to an optimum temperature range for cooling and storage, for calves to be fed with milk directly from the pasteurizing apparatus or for accommodating temperature losses in milk lines, containers or other equipment disposed between the apparatus and the calves. The pasteurizing temperature can be adjusted accordingly because in the present invention, milk temperature does not contribute to pasteurizing.

The present invention also can include a stand pipe with milk volume detector for determining the amount of milk in the vat, and calculating and controlling treatment time based on milk quantity. For example, a 100 gallon vat can be filled or partially filled with 100 gallons or 5 gallons of milk, and the present invention will automatically set an approximate treatment time.

Apparatus of the present invention can also include a mobile storage vat for transporting pasteurized milk to the calves at remote locations. The mobile vat can be insulated and include a spray ball or device for cleaning the mobile vat. A mobile platform may simply transport the vat in which the milk was stored during pasteurization.

Other features and benefits of the invention will be apparent from the detailed description and drawings of this disclosure.

DETAILED DESCRIPTION OF THE PREFERRED EMBODIMENTS

Figure 1:
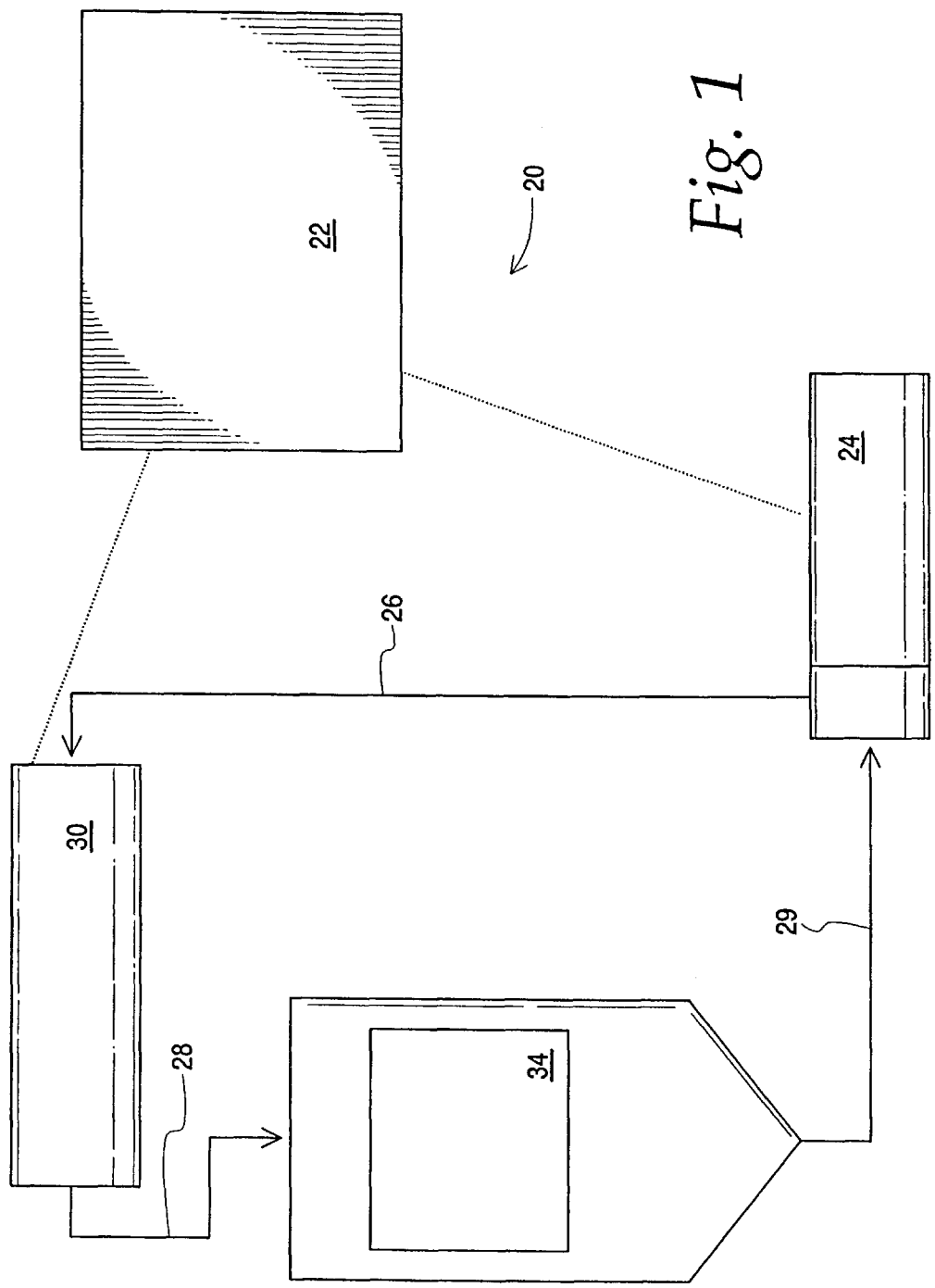
FIG. 1 is a schematic view of a milk treatment system in accordance with the present invention.
Figure 2:
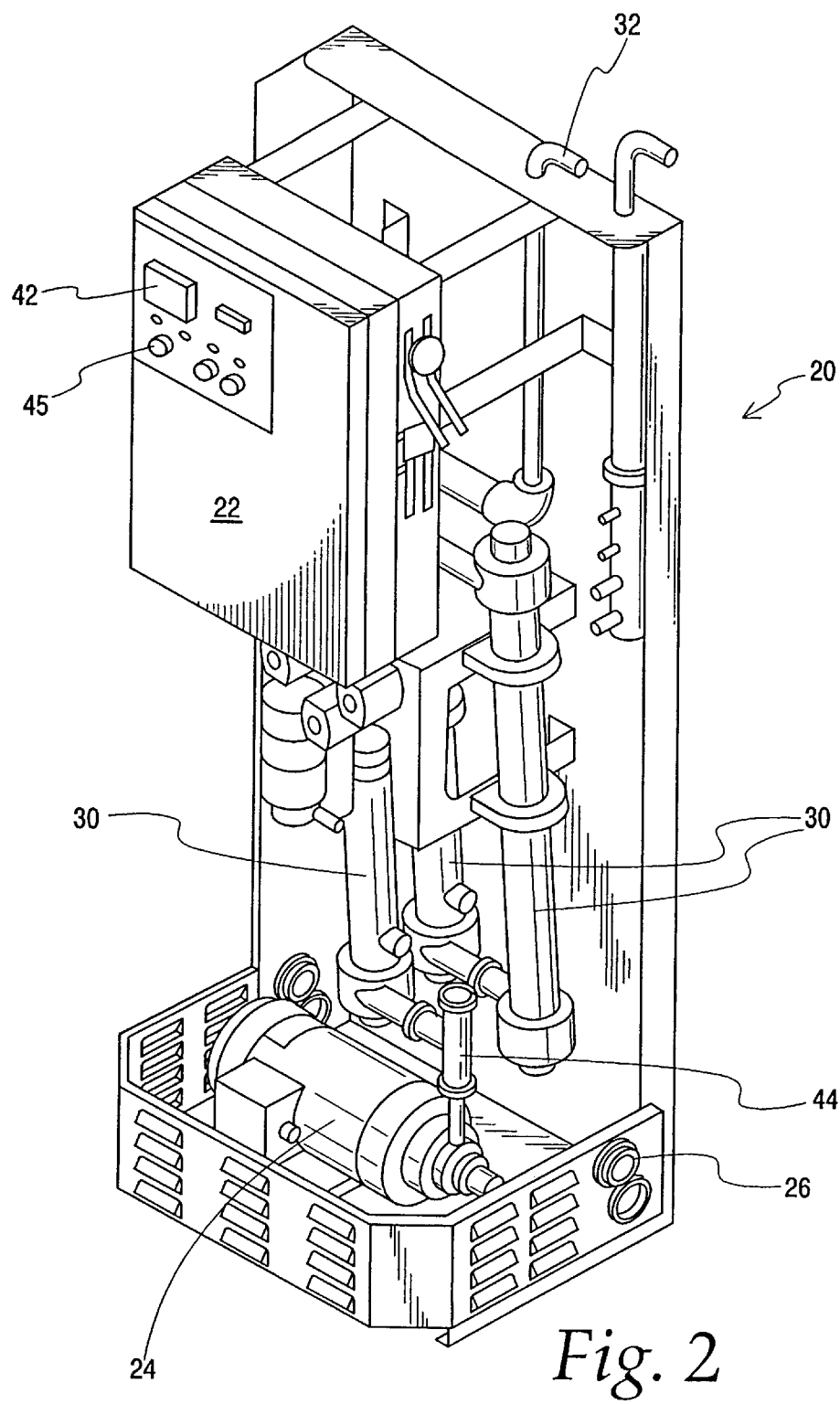
FIG. 2 is a perspective view of a milk treatment system in accordance with the present invention.
Figure 3:
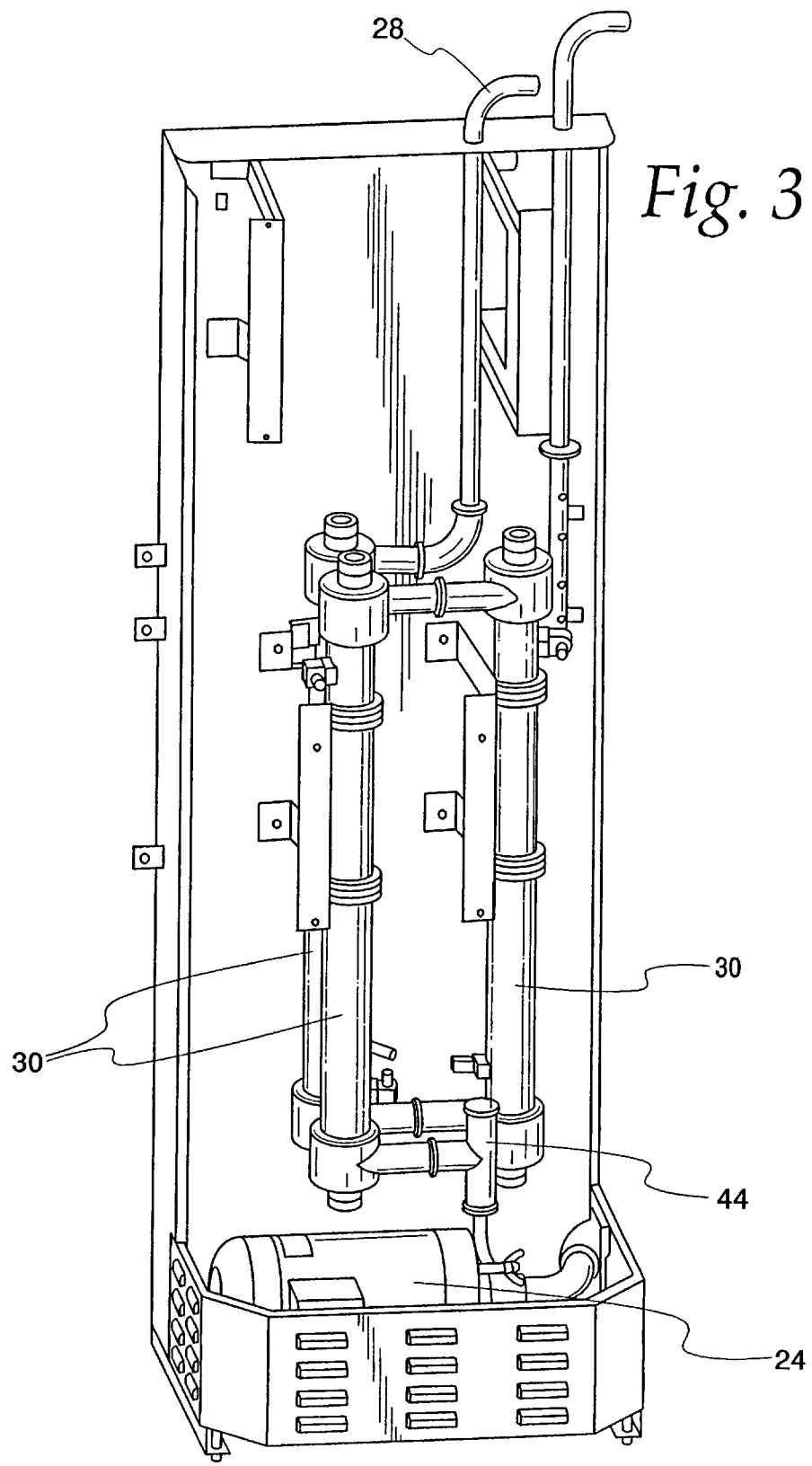
FIG. 3 is a perspective view of the milk treatment system of FIG. 2 with its controller removed.
Figure 4:
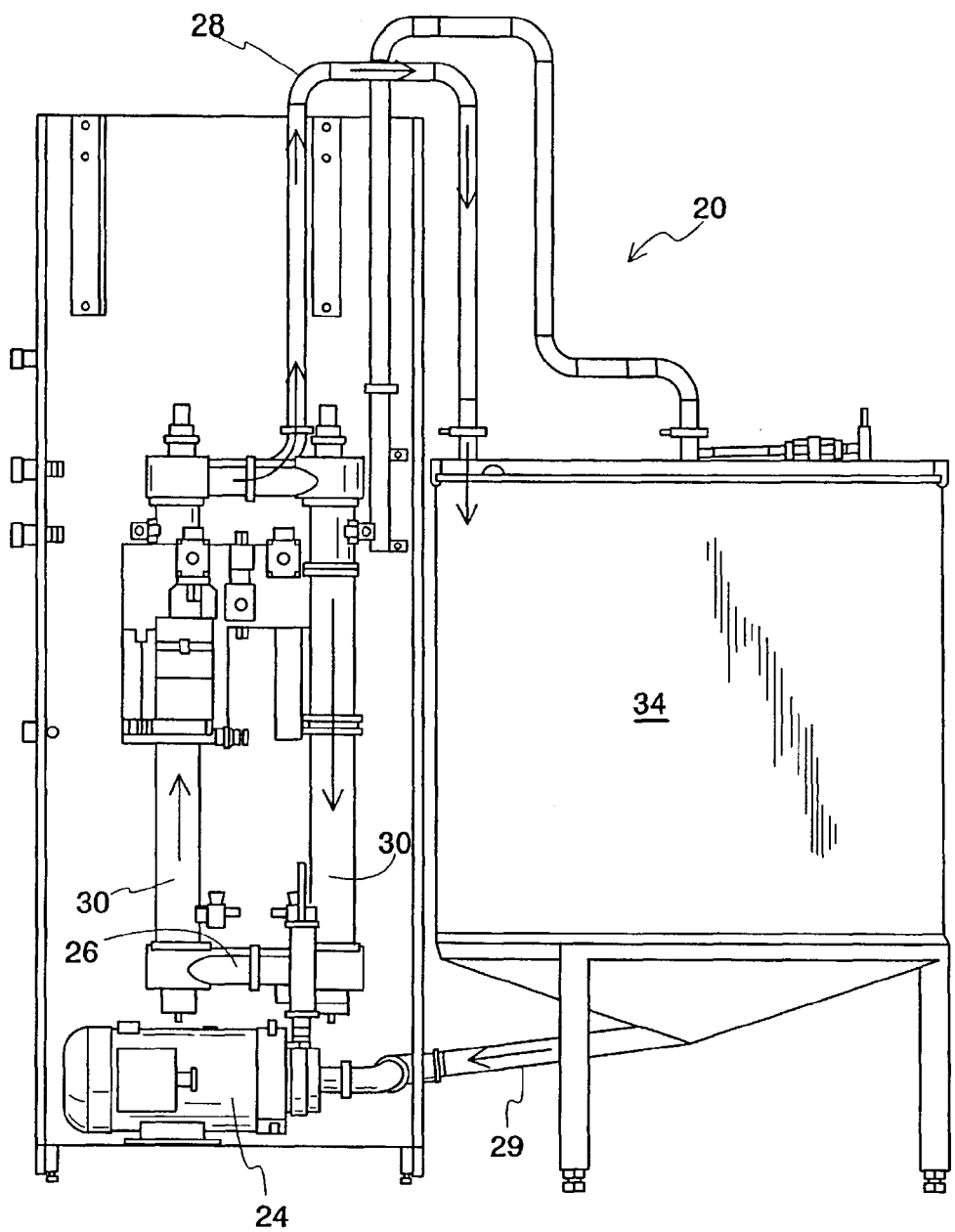
FIG. 4 is a front view of the milk treatment system of FIG. 2 and including a storage vat for milk in accordance with the present invention.
Figure 5:
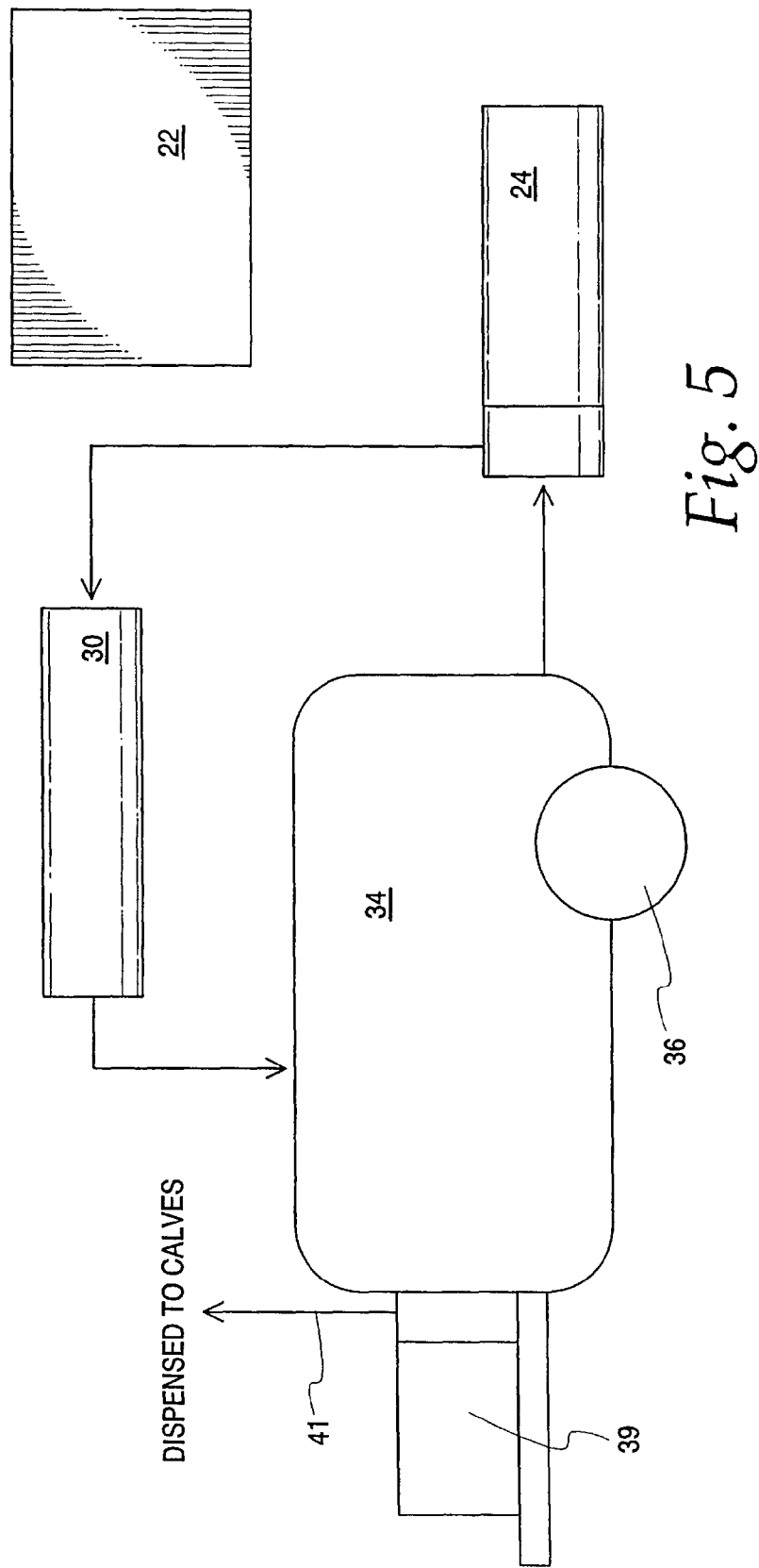
FIG. 5 is a schematic view of the milk treatment system with a mobile platform for transporting the storage vat, in accordance with the present invention.

In the following description of the invention, the same reference numeral will be used to identify the same or similar elements in the each of the figures. FIGS. 1 through 5, and 7 illustrate a waste milk treatment system 20 in accordance with the present invention, including: a controller 22; a milk pump 24; an inlet conduit 26; an outlet conduit 28; a pump inlet conduit 29; an ultraviolet milk treatment device 30 (referred to herein as "UV reactor"); and an outlet conduit 32. A storage vat 34 and a mobile platform 36 (FIG. 5) are used in connection with the milk treatment system 20.

Generally, the depicted milk treatment system 20 uses the milk pump 24 to pump milk through the inlet conduit 26, and into the UV reactor 30. While being treated in the UV reactor 30, the milk is heated or cooled in a heat exchanger to be in a temperature range that minimizes the growth of bacteria without destroying the immunoglobulins that are important for calf health. The treated milk moves through the outlet conduit 28 to be temperature adjusted and stored in the storage vat 34. The milk storage vat 34 may be supported on the mobile platform 36 for transporting the milk to calves before the treated milk falls out of a predetermined temperature range. The mobile platform 36 may also include a milk distribution pump 39 to pump milk through a feed tube 41 to calves.

More specifically, the controller 22 activates the pump 24 to circulate milk to the UV reactor 30 which is preferably surrounded by a heat exchanger 38 to raise milk temperature to between 85° F. and 120° F. and then circulates the warmed milk through the UV reactor 30 at an appropriate rate and frequency to kill harmful bacteria. The milk can then be chilled and stored or fed directly to calves. By raising the milk temperature to only the range of 85° F. to 120° F., there is much less destruction of immunoglobulins and the milk is still safely pasteurized by the UV light from the UV reactor 30.

Unlike batch pasteurizers, UV reactors do not rely on the temperature of the milk to kill bacteria. Instead, the UV light alone in the range of 200 to 280 nanometers, UVC range (germicidal range), kills the bacteria. Nonetheless, milk temperature is important because cold milk is churned by the pump and piping system and butter flakes can form that are less likely to be adequately treated by the UV light. Raising milk temperature to 85° F. or higher is sufficient to melt or reduce the size of butter flakes that form so that the milk is adequately treated by the UV reactors. Preferably, the milk temperature is raised to above 95° F., and more preferably to above 100° F. On the other hand, heating the milk to too high of a temperature can destroy beneficial immunoglobulins. An upper end of the temperature range to minimize destruction of the immunoglobulins is 120° F.

A temperature range of about 85° F. to about 120° F. includes a feeding temperature range of between about 100° F. and about 110° F. If the milk is to be fed directly to calves, then heating to the feeding temperature range of between about 100° F. to 110° F. for pasteurizing is appropriate.

If the milk is to be chilled and stored after pasteurization, a milk temperature in the lower end of the range of 85° F. to 120° F. will produce adequate results in the present invention. It is noted that treated waste milk may need to be transported to the calves where they are kept in the dairy facility. In this situation, heating the milk to above the feeding temperature range can compensate for milk cooling as it is being transported. Heat loss is a function of ambient conditions, the time between pasteurization and feeding, and other factors. Thus, using the present invention, milk temperature can be adjusted to compensate for these and other factors in any particular dairy situation.

Figure 7:
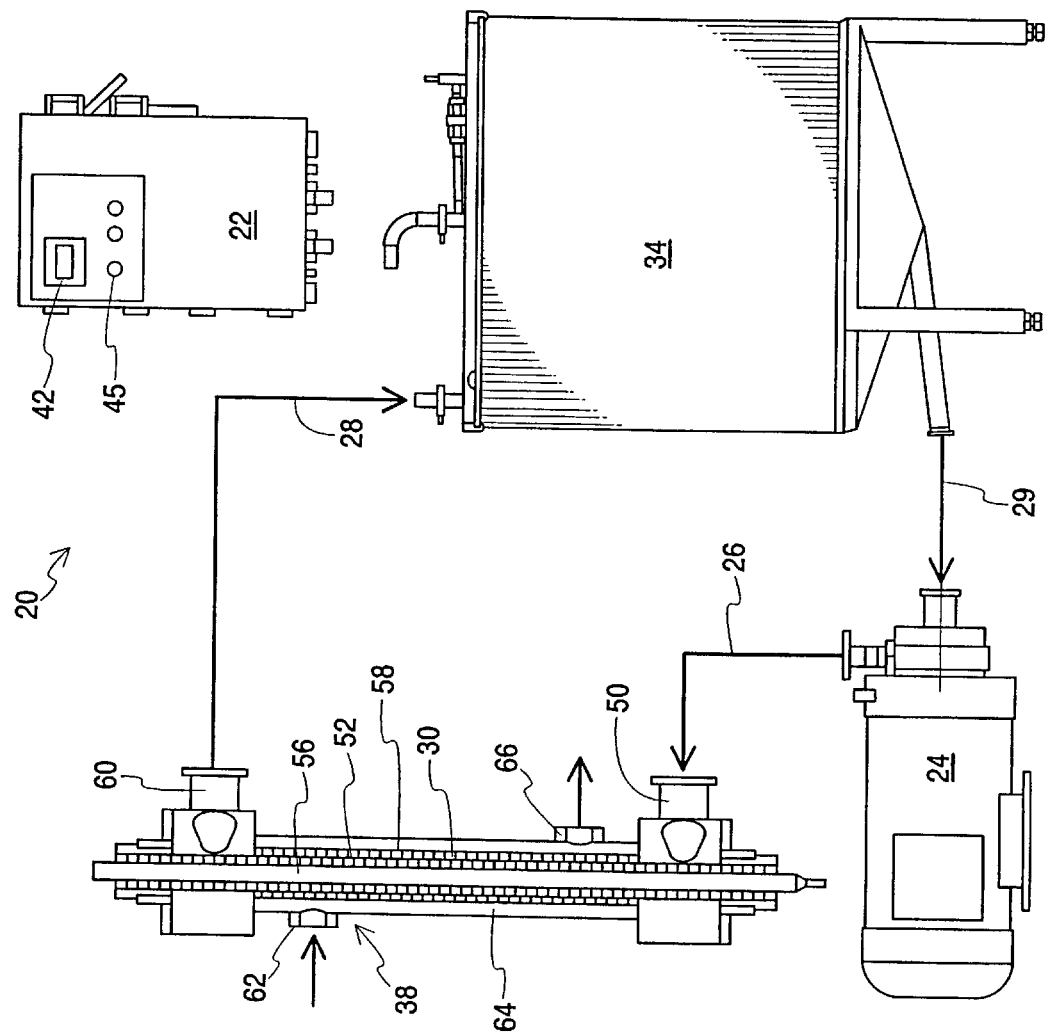
FIG. 7 is a schematic view of the milk treatment system illustrated in FIG. 1, but with a cross-sectional view of the UV reactor.

A preferred heat exchanger 38 for use with the present invention is disposed around the UV reactor 30. The heat exchanger 38 is depicted in FIG. 7 and includes an inlet 62, a water jacket 64, and an outlet 66. The water jacket 64 surrounds and is substantially coaxial with the UV reactor 30 to define an annular space through which water, air or other heat exchanger fluid can flow to adjust the temperature of the UV reactor 30 and the milk being pasteurized therein. Preferably, the water jacket 64 is made of stainless steel, but other materials can be used. The inlet 62 is in communication with a source of water or other fluid, and the fluid source can be a hot water heater, for example. Preferably, the hot water heater is a dedicated unit for the heat exchanger 38, in a closed loop configuration with the heat exchanger 38.

Other types of heat exchangers can be used with the present invention, and be positioned at any point in the milk flow path.

A temperature sensor 44 is used to determine milk temperature throughout the pasteurizing process. Preferably, the temperature sensor 44 is a Precision Fahrenheit Temperature Sensor Model LM34, available from National Semiconductor. If the pasteurization process has been completed and the desired milk temperature has not been reached, milk will continue to be circulated until the desired temperature is reached.

Further, the controller 22 is preferably in communication with a milk quantity sensor 43, which is preferably an integrated silicon pressure sensor (MPX5010GP, Case 867b-04) available from Freescale Semiconductor (www.freescale.com) that uses a long stand tube 42 that traps air when the liquid level of the vat 34 increases. As the milk level in the vat 34 rises, pressure in the long stand tube 42 increases. The milk quantity sensor 43 generates a voltage readout signal that is communicated to the controller 22 to automatically determine run time for any batch size of milk.

Preferably, the controller 22 is set initially by a skilled installer or technician. Adjustments can be made by any dairy operator at an operator interface 45 to adjust temperature, flow rates, treatment time or any other condition in the pasteurizing process.

The controller 22 also provides a display 42 indicating how long it has been since the pasteurizing process has been completed and the milk's current temperature so that re-circulation through the heat exchanger 38 can bring milk temperature back within a desired range. The display 42 can provide a dairy operator with any relevant information, including operating times, flow rates, milk temperature, component failure, maintenance requirements, and so on.

Finally, after pasteurized milk has been distributed to calves or the mobile platform 36, the milk treatment system 20 can be coupled to a wash system (not illustrated) for automatic cleaning and preparation for the next pasteurizing cycle.

The milk treatment system 20 can include one or more UV milk pasteurizer reactors 30. Three UV reactors 30 are used in the illustrated embodiment. UV milk pasteurizers for use in the present invention can be those of the type disclosed in Rix et al., U.S. Pat. No. 6,916,452 (incorporated herein by reference). The UV reactors 30 as depicted in FIG. 7 include an inlet 50, an outlet 60, a quartz tube 52, a UV light bulb 56 disposed inside the quartz tube 52 to prevent milk from contacting the light bulb 56. Other types of tubes can be used to protect the light bulb 56 from being damaged by milk. Surrounding the quartz tube 52 is an outer tube 58 (preferably made of stainless steel) that defines with the quartz tube 52, an annular milk flow channel. The heat exchanger 38 surrounds the outer tube 58. Milk flows through the inlet 50, the annular flow channel 58 where it is pasteurized by UV light, and out the outlet 60.

The UV light bulb 56 is preferably a GIA972T5LCA/2S07/PT-18"/4W/N/CB-061 (UV Pure) available from First Light Technologies, Inc., P.O. Box 191, 212 Ideal Way, Poultney, Vt. 05764. Ballasts for use in the UV reactor 30 preferably are Electronic Ballasts, EVG 100 . . . 200W/230V AC, available from ZED—Ziegler Electronic Devices GmbH. The quartz tube 52 is about one inch in outside diameter and the inside diameter of the outer tube 58 is about 1.37 inches. Further, the outside diameter of the outer tube 58 is about 1.50 inches in diameter and the inside diameter of the water jacket 64 is about 2.37 inches, but other dimensions of the water jacket 64 are possible.

Other combinations of bulbs and ballasts are possible, and it is desirable that the combination be UL rated. The UV reactors 30 can be used in series or parallel to reduce the number of times milk is circulated through the UV reactors. Preferably, the controller 22 of the present invention is in monitoring communication to monitor UV reactor 30 components and adjust treatment time to accommodate defective UV light bulbs 56, ballasts or related components. One way to monitor such components is to monitor electrical current flow through a light bulb, for example. If the bulb is not working no current will be flowing through the bulb.

The pump 24 pumps milk through the UV reactor 30 at a rate that ensures optimal sterilization of milk and/or colostrum and prevents stagnation in the UV reactor 30 related piping, connections, and control systems. Preferably, the flow rate is about 17 gallons per minute, but other flow rates may be used as other system components are changed in size or type.

Preferably, the controller 22 is programmed to operate the milk pump 24 at about seventeen gallons per minute flow rate. Using one UV reactor 30 alone, this flow rate will result in pasteurized milk after about 40 "passes" through the UV reactor 30. Using two UV reactors 30 in series will require about 20 passes, and using three UV reactors in series will require about 13.4 passes through the reactors 30.

For fifty gallons of waste milk at 2.9 minutes per pass, the UV pasteurizing process will take about 59 minutes. This is an improvement over batch pasteurizing heating, treatment, and cooling times. Further, the present invention saves time and energy primarily because the milk does not require heating to such high temperatures. Tests have shown 30% to 70% time savings for the present invention over the batch pasteurizing process.

Further, the present invention promotes efficiencies in dairies because a milk vat 34 can be filled hours before milk is needed, and the pasteurizing process can be initiated automatically by the controller 22 at an appropriate time to warm, pump, pasteurize and store the milk on a mobile platform 36 for transport to calves. This function is preferably set by a pasteurization start timer accessible at the operator interface 45.

Figure 6:
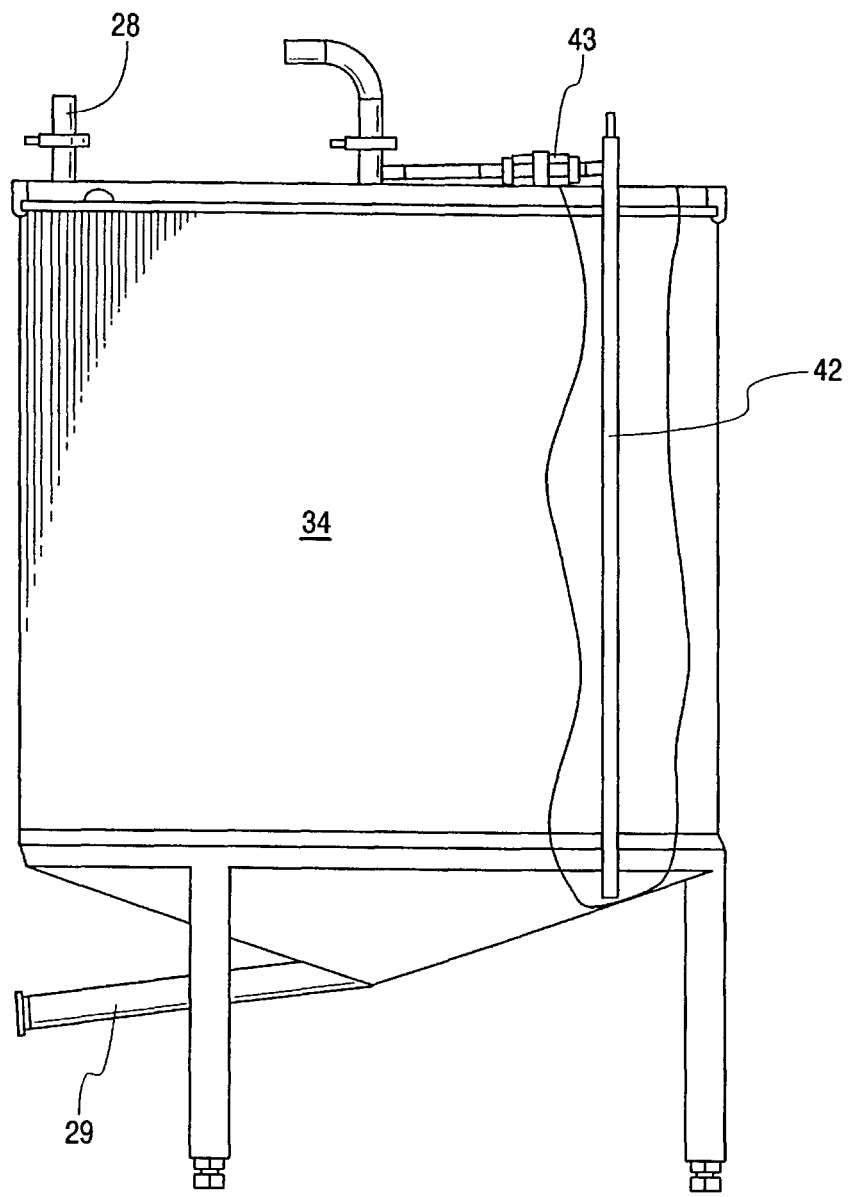
FIG. 6 is a front and partial cross-sectional view of a storage vat and stand pipe in accordance with the present invention.

As depicted in FIG. 6, the present invention also can include a stand pipe 42 with milk volume detector 38 for determining the amount of milk in the vat 34. The controller 22 calculates and controls treatment time based on the milk quantity in the vat 34. For example, a 100 gallon vat 34 can be filled or partially filled with 100 gallons or 5 gallons of milk, and the present invention will automatically set the approximate treatment time.

Apparatus of the present invention can also include a mobile platform 36 (FIG. 5) or storage vat 34 for transporting the milk from the pasteurizer to the calves at remote locations.

The mobile vat 36 can be insulated and include a spray ball or device for cleaning the mobile vat 36. A mobile platform 36 may simply be a frame and wheels to transport the vat 34 in which the milk was stored during pasteurization.

Comparisons between the present invention and the prior art batch pasteurizers illustrate the efficacy of the present invention for use with waste milk and colostrum.

Example A

In this example A, the standard batch pasteurizer is more effective than the UV pasteurizer for all the organisms tested in killing harmful bacteria, but when milk is used, the invention is effective for all three organisms tested (99.98% for *E. coli*, 100% for *B. cereus* and 99.992% for *Salmonella*). However, when colostrum is used the invention is certainly less effective for all three to the point where it may not be effective enough. More research may be needed to determine the maximum effectiveness, in terms of increasing treatment time, for effective bactericidal action on microorganisms when present in colostrum.

Further, single Radial immunodiffusion assays were also run for these samples for bovine IgG. The batch pasteurizer samples displayed a significant reduction in IgG (around 43%) whereas the UV samples had no reduction in IgG at all. Thus, the present invention as shown in Example A results in healthier waste milk, but possibly not healthier colostrum.

| Batch Pasteurizer time - substrate | CFU/ml | % Survival | % Kill |
|---|---|---|---|
| *E. coli* ATCC #25922 | | | |
| Pre heat - milk$^a$ | $3.93 \times 10^6$ | — | — |
| Time 0 minutes - milk$^b$ | $4.60 \times 10^3$ | 0.007% | 99.88% |
| Time 10 minutes - milk | 0 | 0% | 100% |
| Time 20 minutes - milk | 0 | 0% | 100% |
| Time 30 minutes - milk | 0 | 0% | 100% |
| Pre-heat-colostrum$^a$ | $2.31 \times 10^6$ | — | — |
| Time 0 minutes - colostrum$^b$ | 0 | 0% | 100% |
| Time 10 minutes - colostrum | 0 | 0% | 100% |
| Time 20 minutes - colostrum | 0 | 0% | 100% |
| Time 30 minutes - colostrum | 0 | 0% | 100% |
| UV Pasteurizer time - substrate | | | |
| *E. coli* ATCC #25922 | | | |
| Time 0 minutes - milk | $4.41 \times 10^6$ | — | — |
| Time 5 minutes - milk | $1.30 \times 10^5$ | 2.95% | 97.1% |
| Time 10 minutes - milk | $3.73 \times 10^3$ | 0.085% | 99.92% |
| Time 15 minutes - milk | $9.30 \times 10^2$ | 0.021% | 99.98% |
| Time 0 minutes - colostrum | $8.68 \times 10^6$ | — | — |
| Time 5 minutes - colostrum | $6.65 \times 10^6$ | 76.6% | 23.4% |
| Time 10 minutes - colostrum | $2.60 \times 10^6$ | 30.0% | 70.0% |
| Time 15 minutes - colostrum | $1.88 \times 10^6$ | 21.7% | 78.3% |
| Batch Pasteurizer time - substrate | | | |
| *Bacillus cereus* ATCC #4342 | | | |
| Pre heat-milk$^a$ | $1.08 \times 10^5$ | — | — |
| Time 0 minutes - milk$^b$ | 17.5 | 0% | 100% |
| Time 10 minutes - milk | 0 | 0% | 100% |
| Time 20 minutes - milk | 0.5 | 0% | 100% |
| Time 30 minutes - milk$^a$ | 22.5 | 0% | 100% |
| Pre-heat - colostrum$^a$ | $1.10 \times 10^5$ | — | — |
| Time 0 minutes - colostrum$^b$ | 12.5 | 0% | 100% |
| Time 10 minutes - colostrum | 2.5 | 0% | 100% |
| Time 20 minutes - colostrum | 2.5 | 0% | 100% |
| Time 30 minutes - colostrum | 2.5 | 0% | 100% |
| UV Pasteurizer time - substrate | | | |
| *Bacillus cereus* ATCC #4342 | | | |
| Time 0 minutes - milk | $1.61 \times 10^5$ | — | — |
| Time 5 minutes - milk | $1.11 \times 10^4$ | 6.89% | 93.1% |
| Time 10 minutes - milk | $1.80 \times 10^2$ | 0.1118% | 99.89% |
| Time 15 minutes - milk | 12.5 | 0% | 100% |
| Batch Pasteurizer time - substrate | CFU/ml | % Survival | % Kill |
| Time 0 minutes - colostrum | $1.88 \times 10^5$ | — | — |
| Time 5 minutes - colostrum | $5.83 \times 10^4$ | 31.0% | 70.0% |
| Time 10 minutes - colostrum | $2.48 \times 10^4$ | 13.2% | 86.8% |
| Time 15 minutes - colostrum | $1.47 \times 10^4$ | 7.8% | 92.2% |
| Batch Pasteurizer time - substrate | | | |
| *Salmonella cholerasuis* ATCC #6539 | | | |
| Pre heat - milk$^a$ | $3.08 \times 10^6$ | — | — |
| Time 0 minutes - milk$^b$ | $1.50 \times 10^2$ | 0.0049% | 99.995% |
| Time 10 minutes - milk | 5 | 0% | 100% |
| Time 20 minutes - milk | 0 | 0% | 100% |
| Time 30 minutes - milk | 0 | 0% | 100% |
| Pre-heat - colostrum$^a$ | $7.27 \times 10^5$ | — | — |
| Time 0 minutes - colostrum$^b$ | 0 | 0% | 100% |
| Time 10 minutes - colostrum | 0 | 0% | 100% |
| Time 20 minutes - colostrum | 0 | 0% | 100% |
| Time 30 minutes - colostrum | 0 | 0% | 100% |
| UV Pasteurizer time - substrate | | | |
| *Salmonella cholerasuis* ATCC #6539 | | | |
| Time 0 minutes - milk | $3.22 \times 10^6$ | — | — |
| Time 5 minutes - milk | $4.52 \times 10^4$ | 1.40% | 98.6% |
| Time 10 minutes - milk | $8.25 \times 10^2$ | 0.026% | 99.97% |
| Time 15 minutes - milk | $2.68 \times 10^2$ | 0.0083% | 99.992% |
| Time 0 minutes - colostrum | $2.88 \times 10^6$ | — | — |
| Time 5 minutes - colostrum | $6.68 \times 10^5$ | 23.2% | 76.8% |
| Time 10 minutes - colostrum | $1.39 \times 10^5$ | 4.83% | 95.2% |
| Time 15 minutes - colostrum | $8.41 \times 10^4$ | 2.92% | 97.1% |

$^a$Substrate (milk or colostrum) before any heating.
$^b$Substrate (milk or colostrum) right after getting up to the pasteurization temperature (time = 0). This takes about one-half an hour.

Example B

For this example, the UV Pasteurizer trial for the milk was repeated, with the addition of another time at 22 minutes exposure of the milk to UV light. These results are very similar to Example A with a satisfactory level of kill after 15 minutes exposure for 10 gallons of milk with all three bacteria tested.

The second part of the study utilized colostrum which Example A had an ineffective level of kill after 15 minutes for the organisms tested. Example B utilized exposure levels of 30 and 45 minutes. These results indicated better efficacy in two of the three organisms at 15 minutes versus Example A. Example A shows the efficacy at 15 minutes to be marginal for two organisms and unacceptable for the third (Bacillus). At both 30 and 45 minutes exposure, however, the efficacy of the pasteurizer of the present invention for all three organisms was adequate to very good.

Further, Single Radial immunodiffusion assays were also run for these samples for bovine IgG. The results indicated no reduction in immunoglobulin (IgG) after 15 minutes and a relatively minimal reduction in immunoglobulin (IgG) after 30 and 45 minutes. Thus, the present invention as reflected in Example B results in healthier milk and colostrum than the prior art batch pasteurizer.

| UV Pasteurizer time - substrate | CFU/ml | % Survival | % Kill |
|---|---|---|---|
| *E. coli* ATCC #25922 | | | |
| Time 0 minutes - milk | $9.55 \times 10^6$ | — | — |
| Time 5 minutes - milk | $1.81 \times 10^5$ | 1.90% | 98.1% |
| Time 10 minutes - milk | $1.34 \times 10^3$ | 0.014% | 99.986% |
| Time 15 minutes - milk | $4.53 \times 10^2$ | 0.005% | 99.995% |

| UV Pasteurizer time - substrate | CFU/ml | % Survival | % Kill |
|---|---|---|---|
| Time 22 minutes - milk | $6.50 \times 10^1$ | 0.0007% | 99.9993% |
| Time 0 minutes - colostrum | $1.47 \times 10^7$ | — | — |
| Time 15 minutes - colostrum | $1.28 \times 10^5$ | 0.87% | 99.1% |
| Time 30 minutes - colostrum | $7.03 \times 10^3$ | 0.048% | 99.95% |
| Time 45 minutes - colostrum | $2.92 \times 10^2$ | 0.002% | 99.998% |
| *Bacillus cereus* ATCC #4342 | | | |
| Time 0 minutes - milk | $5.07 \times 10^3$ | — | — |
| Time 5 minutes - milk | $2.26 \times 10^3$ | 44.58% | 55.4% |
| Time 10 minutes - milk | $2.80 \times 10^1$ | 0.56% | 99.4% |
| Time 15 minutes - milk | 3.3 | 0.065% | 99.93% |
| Time 22 minutes - milk | 0 | 0% | 100% |
| Time 0 minutes - colostrum | $1.43 \times 10^4$ | — | — |
| Time 15 minutes - colostrum | $5.18 \times 10^3$ | 36.0% | 63.8% |
| Time 30 minutes - colostrum | $3.67 \times 10^2$ | 2.57% | 97.4% |
| Time 45 minutes - colostrum | 8.3 | 0.058% | 99.94% |
| *Salmonella cholerasuis* ATCC #6539 | | | |
| Time 0 minutes - milk | $4.66 \times 10^3$ | — | — |
| Time 5 minutes - milk | $6.30 \times 10^1$ | 1.35% | 98.6% |
| Time 10 minutes - milk | 0 | 0% | 100% |
| Time 15 minutes - milk | $2.83 \times 10^1$ | 0.61% | 99.3% |
| Time 22 minutes - milk | 6.7 | 0.14% | 99.86% |
| Time 0 minutes - colostrum | $3.72 \times 10^6$ | — | — |
| Time 15 minutes - colostrum | $2.68 \times 10^4$ | 0.72% | 99.28% |
| Time 30 minutes - colostrum | $5.73 \times 10^2$ | 0.0154% | 99.98% |
| Time 45 minutes - colostrum | $3.0 \times 10^1$ | 0.0008% | 99.9992% |

Example C

This example utilized colostrum at the same exposure levels of 15, 30 and 45 minutes as Example B. These results indicated that the UV Pasteurizer of the present invention overall is still effective at 30 and 45 minutes, especially the latter time. The only possible exception is possibly the Bacillus where only the 45 minute exposure time showed solid results. The results generally showed less percent kill then the previous test at the same exposure times, but the Time 0 concentrations were also higher, which probably accounts for this reduction in kill. In real field use, the concentration of these pathogens is very unlikely to be anywhere near what is being tested in this example. It can therefore be concluded that the kill rates are satisfactory at both 30 and 45 minutes.

Further, Single Radial immunodiffusion assays were also run for these samples for bovine IgG. The results indicated minimal or no reduction in immunoglobulin (IgG) after 15, 30 and 45 minutes. This is therefore, a distinct improvement over batch pasteurizing.

| UV Pasteurizer time - substrate | CFU/ml | % Survival | % Kill |
|---|---|---|---|
| *E. coli* ATCC #25922 | | | |
| Time 0 minutes - colostrum | $3.40 \times 10^7$ | — | — |
| Time 15 minutes - colostrum | $3.26 \times 10^6$ | 9.59% | 90.4% |
| Time 30 minutes - colostrum | $1.26 \times 10^5$ | 0.37% | 99.6% |
| Time 45 minutes - colostrum | $3.68 \times 10^3$ | 0.011% | 99.989% |
| *Bacillus cereus* ATCC #4342 | | | |
| Time 0 minutes - colostrum | $2.16 \times 10^4$ | — | — |
| Time 15 minutes - colostrum | $1.22 \times 10^4$ | 56.5% | 43.5% |
| Time 30 minutes - colostrum | $1.14 \times 10^3$ | 5.28% | 94.7% |
| Time 45 minutes - colostrum | $8.50 \times 10^1$ | 0.39% | 99.6% |
| *Salmonella cholerasuis* ATCC #6539 | | | |
| Time 0 minutes - colostrum | $1.16 \times 10^7$ | — | — |
| Time 15 minutes - colostrum | $6.33 \times 10^5$ | 5.46% | 94.5% |
| Time 30 minutes - colostrum | $1.56 \times 10^4$ | 0.13% | 99.87% |
| Time 45 minutes - colostrum | $6.75 \times 10^2$ | 0.0058% | 99.994% |

[a]Colony-forming units per ml.

The above examples illustrate the effectiveness of the present invention in killing three types of pathogens while preserving essentially all of the immunoglobulins in milk and colostrum.

The previous detailed description of the preferred embodiments of the invention are presented for clearness of understanding, and are not intended to limit the scope of the following claims. Further, the term "milk" as used in the claims is intended to be broad enough to include milk, waste milk, non-saleable milk, colostrum or any other calf feed supplement that would benefit from pasteurizing prior to feeding to calves.

The invention claimed is:

1. A milk treatment system comprising:
   an ultraviolet milk treatment device having an inlet and an outlet;
   a milk heat exchanger; and
   a controller in communication with the heat exchanger to control heat exchanger treatment temperature to treat milk without reaching pasteurizing temperatures of 145° F.

2. The milk treatment system of claim 1, wherein the ultraviolet milk treatment device comprises:
   a plurality of ultraviolet milk pasteurizing reactors arranged in series.

3. The milk treatment system of claim 1, and further comprising:
   a mobile platform supporting the ultraviolet milk treatment device.

4. The milk treatment system of claim 1, and further comprising:
   a mobile platform supporting the ultraviolet milk treatment device; and
   the controller raises or lowers the heat exchanger temperature.

5. The milk treatment system of claim 1, wherein the controller is in monitoring communication with the ultraviolet milk treatment device, to obtain milk flow rate data.

6. The milk treatment system of claim 1, and further comprising:
   a milk quantity sensor to obtain milk quantity data from milk in a storage vat and to transmit the milk quantity data to the controller.

7. The milk treatment system of claim 1, wherein the controller includes an operator interface for adjusting controller operating parameters.

8. The milk treatment system of claim 1, wherein the controller comprises:
   a milk treatment start timer.

9. The milk treatment system of claim 1, wherein the controller adjusts the milk heat exchanger to a milk temperature range of about 85° F. to about 120° F.

10. The milk treatment system of claim 1, wherein the controller adjusts the milk heat exchanger to a milk temperature of at least about 85° F.

11. The milk treatment system of claim 1, wherein the controller adjusts the milk heat exchanger to a milk temperature of at least about 95° F.

12. The milk treatment system of claim 1, wherein the controller adjusts the milk heat exchanger to a milk temperature of at least about 100° F.

13. A milk treatment system comprising:
- an ultraviolet milk treatment device having an inlet and an outlet;
- a milk heat exchanger and the heat exchanger includes a water jacket surrounding at least a portion of the ultraviolet milk treatment device; and
- a controller in communication with the heat exchanger to control heat exchanger temperature.

14. A milk treatment system comprising:
- an ultraviolet milk treatment device having an inlet and an outlet;
- a milk heat exchanger and the ultraviolet milk treatment device is disposed at least partially in the milk heat exchanger; and
- a controller in communication with the heat exchanger to control heat exchanger temperature.

* * * * *